United States Patent [19]

Patzschke et al.

[11] Patent Number: 4,476,261

[45] Date of Patent: Oct. 9, 1984

[54] AQUEOUS COATING COMPOSITION

[75] Inventors: Hans-Peter Patzschke, Wuppertal; Eduard Ehmann, Sprockhoevel, both of Fed. Rep. of Germany

[73] Assignee: Herberts Gesellschaft mit beschraenkter Haftung, Wuppertal, Fed. Rep. of Germany

[21] Appl. No.: 563,966

[22] Filed: Dec. 21, 1983

[30] Foreign Application Priority Data

Dec. 23, 1982 [DE] Fed. Rep. of Germany ....... 3247756

[51] Int. Cl.$^3$ .................. C09D 3/58; C09D 3/66; C09D 5/40; C25D 9/02
[52] U.S. Cl. ................ 523/402; 204/181 C; 523/406; 523/415
[58] Field of Search ............... 204/181 C; 523/402, 523/406, 415

[56] References Cited

U.S. PATENT DOCUMENTS

| 4,031,050 | 6/1977 | Jerabek | 523/415 |
|---|---|---|---|
| 4,220,568 | 9/1980 | Patzschke | 528/302 |
| 4,252,703 | 2/1981 | Patzschke et al. | 204/181 C |
| 4,256,621 | 3/1981 | Shimokai et al. | 204/181 C |
| 4,294,940 | 10/1981 | Hino et al. | 204/181 C |
| 4,315,840 | 2/1981 | Kempter et al. | 204/181 C |
| 4,364,860 | 12/1982 | Patzschke et al. | 525/127 |
| 4,373,059 | 2/1983 | Patzschke et al. | 525/438 |
| 4,373,072 | 2/1983 | Patzschke et al. | 525/454 |
| 4,384,946 | 5/1983 | Patzschke et al. | 204/181 C |

FOREIGN PATENT DOCUMENTS 55-125172 9/1980 Japan .
1603049 11/1981 United Kingdom .

Primary Examiner—Ronald W. Griffin
Attorney, Agent, or Firm—Schwartz, Jeffery, Schwaab, Mack, Blumenthal & Koch

[57] ABSTRACT

Aqueous coating composition, particularly for electrophoretic coating, containing, related to the total quantity of the binders contained in the coating composition, (A) 40 to 90% by weight of polyesters containing carboxyl groups;
(B) 5 to 30% by weight of block polyisocyanates;
(C) 5 to 40% by weight of polymers containing glycidyl groups and containing free epoxy groups; and
(D) 0 to 20% by weight of hydroxyl group-containing polyesters and/or acrylic resins, and a process for the preparation of these aqueous coating compositions. The invention also relates to the use of these coating compositions for the production of coatings, particularly by the electrophoretic coating process.

20 Claims, No Drawings

AQUEOUS COATING COMPOSITION

BACKGROUND OF THE INVENTION

1. Field of the Invention

The present invention relates to an aqueous coating composition, particularly for electrophoretic coatings, containing
(A) polyesters containing carboxyl groups,
(B) blocked polyisocyanates,
(C) polymers containing glycidyl groups, and
(D) optionally, hydroxyl group-containing polyesters and/or acrylic resins.

2. Background of the Art

The introduction of synthetic resins, which can be thinned with water, is of great importance in paint technology, because, as a result of a low content of organic solvents, environmental protection requirements are met and the fire and explosion hazard is reduced.

It is known to introduce pulverulent high-molecular compounds, such as epoxy resins of the epichlorhydrin-bis-phenol type, having a molecular weight of about 1000 and higher, into the bath liquid. In this case, however, problems arise with respect to uniform dispersion of the powder. They are solved in West German Patent Application No. A 16 21 886 by using as the main component a film-forming ionic polycarboxylic acid resin, having an electric deposition equivalent of 1000 to 20,000 and an acid number of 30 to 300, particularly a maleic oil or acrylic resin, which is then jointly deposited with the powder.

According to European Patent Application No. A 15 035, a solid epoxy resin powder is incorporated into a water-thinnable maleic oil.

According to West German Patent Application No. A 30 38 243, the solid epoxy resin powder is incorporated, in combination with solid and/or liquid organic crosslinking agents, such as melamine resins or urea resins, dicyandiamide or substituted biguanides, into water-thinnable polyesters or modified alkyd resins.

According to West German Patent Application No. B 21 64 844, the powder, being the main component, is wetted with an organic solvent, which is virtually insoluble in water and has no solvent power for the powder either. Subsequently, the mixture is suspended in water containing 0.05 to 5 parts by weight of a surface-active compound. Neither process has made it possible so far to produce stable electrophoretic coating media, which yield advantages by comparison with the known level of properties. Either precipitation phenomena occur between the carrier resin and powder resin or the mechanical or anti-corrosive properties have not satisfied the increased requirements. Production of suitable powders, having the lowest possible particle size, involves economically not justifiable expenditure.

West German Patent Application No. A 28 24 418 describes polyesters, containing carboxyl groups, which can be processed, in combination with blocked polyisocyanates, esterified polyglycidyl ethers and/or hydroxyl group-containing polyesters and/or acrylic resins, to yield aqueous coating media, by means of which bright single layer coatings are obtained. Electrophoretic deposition at the anode makes an economical automatic working method feasible. However, the properties of the stoved films leave something to be desired, for example, greater resistance to detergents, slight odour nuisance and higher layer thicknesses.

SUMMARY OF THE INVENTION

The present invention is based on the problem of avoiding the last-mentioned disadvantages. It has now been surprisingly found that a combination of polyesters containing carboxyl groups, blocked polyisocyanates and polymers containing glycidyl groups as well as, optionally, hydroxyl group-containing polyesters and/or acrylic resins yields aqueous coating compositions, by means of which a broad, improved spectrum of properties in the above sense can be achieved.

Accordingly, the subject of the invention is an aqueous coating composition, particularly for electrophoretic coating, comprising (A) polyesters containing carboxyl groups, having an acid number of 30 to 150, a hydroxyl number of 20 to 150 and a Patton alkyd constant of 0.9 to 1.2, derived from dihydric and/or polyhydric aliphatic and/or cycloaliphatic saturated alcohols, aliphatic, cycloaliphatic and/or monocyclic aromatic dibasic and/or polybasic polycarboxylic acids and, optionally, linear or branched, saturated or unsaturated, aliphatic and/or cycloaliphatic $C_3$ to $C_{20}$ monohydric alcohols or monobasic carboxylic acids;
(B) blocked polyisocyanates,
(C) polymers containing glycidyl groups, and
(D) optionally, hydroxyl group-containing polyesters and/or acrylic resins. The invention is further characterised in that, related to the total weight of the binders (A) to (D), contained in the coating composition,
(A) the component (A) is present in a quantity of 40 to 90% by weight;
(B) the component (B) is present in a quantity of 5 to 30% by weight;
(C) the component (C) is represented by polymers containing glycidyl groups and containing free epoxy groups and is present in a quantity of 5 to 40% by weight; and
(D) the component (D) is present in a quantity of 0 to 20% by weight.

The coating composition according to the invention also contains, as is known in this technical field, small quantities of organic solvents, due to the introduction of solutions of the binders. The upper limit for the proportion of organic solvents is about 15% by weight, appropriately about 10% by weight and is particularly preferred to be about 5% by weight, related to the total weight of aqueous coating composition. These are extremely low values.

Component (A), the polyester containing carboxyl groups, is the so-called base resin of the aqueous coating composition. As is known in this technical field, the base resin is water-thinnable by neutralisation and may contain small quantities of organic solvents. The other components are added for producing the aqueous coating composition. Components (B), blocked polyisocyanate, and (C), polymers containing glycidyl groups, can be incorporated as powders or in the form of solutions into the solution of the base resin. This will be further explained in the following description. A special advantage of the invention is that stable coating compositions, that is to say, paints on finishes having a broad, improved spectrum of properties, can be obtained by admixture exclusively of solutions of the binder components of the aqueous coating composition. It would have had to be expected that an undesirable reaction would take place during the incorporation of the polymers containing glycidyl groups in the form of solutions into a solution which contains resins containing carboxyl groups. However, this is surprisingly not the case. In this manner, the production of powder and the problems connected with adequate dispersion of powders are also avoided.

If the coating composition contains Component (D), these hydroxyl group-containing polyesters and/or acrylic resins are incorporated into the aqueous coating composition in the form of solutions or, if they have liquid consistency, as such liquids.

The polyesters, containing carboxyl groups, of Component (A) are reaction products of dihydric and/or polyhydric aliphatic and/or cycloaliphatic saturated alcohols, aliphatic, cycloaliphatic and/or monocyclic aromatic dibasic and/or polybasic polycarboxylic acids and, optionally, linear and/or branched, saturated or unsaturated, aliphatic and/or cycloaliphatic $C_3$ to $C_{20}$ monohydric alcohols or monobasic carboxylic acids. The quantitative ratios of the starting components are calculated, using the Patton alkyd constant, from the molecular ratios that lead to the required acid numbers and hydroxyl numbers of the resin. The selection of the individual starting components, with this aim in mind, is known to those skilled in the art. Appropriately, the acid number ranges from 30 to 150, the hydroxyl number from 20 to 150 and the Patton alkyd constant from 0.9 to 1.2. The mean molecular weight ($M_n$) ranges appropriately from about 1000 to 6000, preferably from about 2000 to 4000, measured against polystyrene as the calibrating substance. Oil-free polyesters containing carboxyl groups, as described in U.S. Pat. No. 3,053,783 or in the above-mentioned West German Patent Application No. A 28 24 418, are particularly preferred.

Preferably, these polyesters contain 0.3 to 3.0, with special preference for 0.5 to 2.5, milli-equivalents of aliphatic, cycloaliphatic and/or monocyclic aromatic dicarboxylic acids per gram of resin, incorporated by condensation. Appropriately, 0.8 to 2.0, preferably 0.9 to 1.8, with special preference for 1.1 to 1.5, millimoles per gram of resin, of the tribasic of tetrabasic cyclic carboxylic acids are linked to the polyester via only one carboxyl group. The polycarboxylic acids employed are tribasic and/or polybasic polycarboxylic acids, preferably tribasic and/or tetrabasic acids.

Production of these polyesters takes place in a manner that is known per se, by polycondensation of the starting substances, the process being carried out preferably in steps, so as to avoid haze or gel formations:

1. Preferably, the esterification of preferably aromatic and cycloaliphatic dicarboxylic acids, which are not capable of forming an intramolecular anhydride, is effected with dihydric alcohols containing either secondary OH groups or primary OH groups, the latter being sterically hindered by beta-substitution, in which case a polyester containing OH groups is formed by excess alcohol. Preferably, the alcohols contain 2 to 21, with special preference for 4 to 8, C-atoms. Preferably, the dicarboxylic acids contain 5 to 10 C-atoms, with special preference for 6, C-atoms. Examples of these are isophthalic acid and terephthalic acid, 1,3- and 1,4-cyclohexanedicarboxylic acid or alkyl-substituted dicarboxylic acids, such as butyl-isophthalic acid. Isophthalic acid is particularly preferred. For obtaining branching developments, part of the dicarboxylic acids can be incorporated by condensation into the resin molecule via all the carboxyl groups by means of a suitable quantity of tricarboxylic acid, such as trimellitic anhydride. On the other hand, dimethyl esters, such as dimethyl terephthalate of 1,4-dimethyl cyclohexane can be introduced into the polyester by transesterification, if appropriate, in the presence of transesterification catalysts.

The dihydric alcohols preferably employed are neopentyl glycol, pentylglycol hydroxypivalate, 2,5-hexanediol, 1,4-bis-(hydroxymethyl)cyclohexane, 1,1-isopropylidene-bis-(p-phenoxy)-2-propanol and 2,2,4-trimethylpentan-1,3-diol.

The glycidyl ester of alpha-branched fatty acids, such as versatic acid, can also be used as a dihydric alcohol, because the fatty acid is incorporated into the molecular structure so as to be stable to hydrolysis. In special cases, it is also feasible to employ epoxy resins, the epoxide groups of which have been reacted with monohydric alcohols. A proportionate use of polyols, having more than two OH groups, such as trimethylolpropane or pentaerythritol is feasible for adjusting suitable OH numbers and viscosities. The same is true of a slight modification for increasing elasticity by means of long chain dihydric alcohols, such as hexan-1,6-diol, or of aliphatic dicarboxylic acids, such as adipic acid. Esterification of this pre-condensate is effected in a known manner, azeotropically or in the melt at elevated temperatures (above 190° C.) and yields a clear product having an acid number of 0 to 50, particularly 5 to 25, and a viscosity of 200 to 3000 mPas at 25° C., measured in a 75% butyl cellosolve (2-butoxy-ethanol) solution.

2. In order to bring about solubility in aqueous alkaline medium, carboxyl groups have to be additionally introduced into the OH-containing polyesters. For this purpose, a reaction is carried out at temperatures below 190° C. with an aromatic or cycloaliphatic dicarboxylic acid, which is preferably formed in inactivating the functional groups by means of a long chain, aliphatic, hydrophobic monohydric alcohol derived from a polycarboxylic acid having three or four carboxyl groups, such as trimesic acid, hemimellitic acid, prehnitic acid, mellophanic acid etc. The process is rendered particularly easy by employing anhydride-containing compounds, such as trimellitic anhydride, pyromellitic anhydride or corresponding hydrogenated ring systems or cyclopentane-tetracarboxylic anhydride or pyrazine-tetracarboxylic anhydride. The polycarboxylic acids are reacted stoichiometrically in a two-vessel process with such a quantity of monohydric alcohol that a dicarboxylic acid remains, which is subsequently added to the polyester, containing OH groups, at temperatures of about 150° to 190° C.

In practice, the production of suitable semi-esters, containing carboyxl groups, in the presence of the OH group-containing polyester as a single vessel process by addition of approximately stoichiometric quantities of monohydric alcohol and trimellitic anhydride in the sequence indicated has proved satisfactory. The monohydric alcohols employed can be straight chain and/or tertiary, with special preference for primary and/or secondary, alcohols. Mixtures, particularly isomeric mixtures, of these alcohols can also be employed. Aliphatic $C_6$ to $C_{18}$ iso-monohydric alcohols are particularly preferred. Particularly hydrolysis-stable semi-esters are obtained by using alpha-branched monohydric alcohols or secondary monohydric alcohols, such as cyclohexanol or secondary methyl octyl alcohol. The structure of the resin ensures that the first dissociation products, formed by hydrolysis,—monohydric alcohol and trimellitic mono-ester,—are deposited electrophoretically with the film without trouble.

The molar ratios of the overally formulation are chosen such that a viscosity suitable for the particular application purpose is attained. It is about 200 to 3000, appropriately 250 to 2000, mPas, preferably 300 to 1500 mPas, measured in a 50% butyl cellosolve solution at 25° C. Just like the molecular weight, it can be attained by mixing resins of higher and lower viscosity or molecular weight, respectively. The Patton alkyd constant (K=total molecule number divided by the number of acid equivalents), in this case, ranges between 0.9 and 1.2, appropriately from 0.93 to 1.05, preferably between 0.94 and 1.0. The upper limit for the acid number lies preferably below 100, with special preference for below 60; the lower limit for the acid number lies preferably above 35, with special preference for above 40. The carboxyl group-containing polyester contains at least one, preferably at least two, carboxyl groups per molecule, with a $pK_a$ value of 1 to 8, particularly 2.5 to 6, so as to attain water solubility by salt formation with a low-molecular base. The $pK_a$ value is the negative common logarithm of the acidic dissociation constant. If the acid number is too small, the solubility is too low; if it is too large, the high degree of neutralisation causes increasing electrolysis, which leads to surface troubles. The excess of alcohol chosen yields in the finished resin a hydroxyl number of about 10 to 150, preferably of 30 to 90. Those resins are preferred that contain a relatively high hydroyxyl number at a low acid number.

Polycondensation is effected azeotropically or in the melt at reaction temperatures of between about 150° and 240° C., preferably between 160° and 210° C. When the desired parameters (viscosity, acid number) have been attained, the mixture is cooled to about 100° to 120° C. and diluted with glycolic or alcoholic solvents, such as ethylene glycol monobutyl ether, ethylene glycol monoethyl ether, diethylene glycol dimethyl ether, propylene glycol monomethyl ether, diacetone alcohol, sec.-butanol, isopropanol etc., so as to obtain a workable solution. The solids content of the dissolved resin is about 60 to 90% by weight and depends on the viscosity of the solution. An easily workable solution is aimed at, having the highest possible solids content.

Component (B) are blocked polyisocyanates, having, on average, more than one isocyanate group, preferably at least two isocyanate groups, per molecule. They shall be storage-stable in the aqueous phase at an approximately neutral to weakly basic pH value, dissociate under the influence of heat of about 140° to 210° C. and crosslink with the reactive hydroxyl and/or carboxyl groups that are still present in the resin structure. Blocked polyisocyanates are obtained by reacting stoichiometric quantities of polyisocyanate with monofunctional compounds containing active hydrogen. The reactants and, where appropriate, catalysts are reacted preferably at temperatures of about 50° to 80° C., possibly in the presence of inert solvents. Cooling prevents the reaction temperature from rising above about 100° to 120° C.

Aromatic, aliphatic and cycloaliphatic polyisocyanates are suitable. Typical examples are isomers or isomer mixtures of toluylene diisocyanate, 4,4'-diphenylmethane diisocyanate and their hydrogenation products, such as dicyclohexyl-methane diisocyanate. Moreover, hexane-1,6-diisocyanate, 1,6-diisocyanato-2,2,4-trimethylhexane and 1-isocyanato-methyl-3-isocyanato-1,5,5trimethylcyclohexane find application. Higher molecular polyisocyanates, formed by dimerisation or trimerisation, or NCO-adducts, formed by a suitable reaction of diisocyanates with water or low molcular polyols, such as trimethylolpropane or triethylisocyanurate, can also be used. Products of this type are commercially marketed, such as triphenylmethane-4,4',4"-triisocyanate (Desmodur R), the biuret made from hexamethylene diisocyanate and water (Desmodur N) or the adduct made from toluylene diisocyanate and trimethylolpropane (Desmodur L). Here again, chain rupture or chain extensions can be effected,—depending on the functional group,—by reaction with compounds containing reactive hydrogen, amide compounds, urethane compounds or urea compounds being formed. Suitable isocyanate-containing prepolymers are also prepared by reaction of polyglycol ether, polyester polyols, polyether polyols, polycaprolactone polyols, polycaprolactam polyols or polyaminoamides with excess polyisocyanates at temperatures of about 30° to 100° C., possibly with addition of catalysts, such as dibutyltin dilaurate or tertiary amines.

For controlling the application properties, the existing number of isocyanate groups can be reduced by reaction with saturated or unsaturated monohydric alcohols or suitable secondary amines of various chain lengths.

Suitable blocking agents are phenols, cresols, lactams, oximes, ethyl acetoacetate, thiophenols, phthalimide, imidazole, acetylacetone, ethyl malonate, alcohols etc. Caprolactam, phenol or cresol and methyl ethyl ketoxime are preferred. If protective groups are used, which diisociate only at elevated temperatures and have low volatility, such as the higher alcohols, these components remain in the film as plasticisers to a large extent. The stoving temperature can be lowered by admixing suitable catalysts in a concentration of about 0.1 to 2% by weight, related to the resin solids. Organic metal compounds, such as tin octoate, dibutyltin dilaurate, iron acetylacetonate or zinc acetylacetonate, are suitable for this purpose.

Polymers containing glycidyl groups, simply also called epoxy resins in the following, in liquid or solid form, are suitable as Component C. Particularly resins, which contain 1,2-epoxide groups and, on average, more than one epoxide group, preferably at least two epoxide groups, per molecule and have a molecular weight of more than 350, particularly more than 850, are particularly used.

They can be prepared by
(1) introducing glycidyl groups in alkaline medium via, for example, epichlorohydrin,
 (a) into aliphatic, cycloaliphatic or aromatic OH-functional resins, e.g. epoxy novolacs, with formation of polyglycidyl ethers;
 (b) into aliphatic, cycloaliphatic or aromatic COOH-functional resins, with formation of polyglycidyl esters, or
 (c) into aliphatic, cycloaliphatic or aromatic $NH_2$-functional resins, with formation of polyglycidylamines;
(2) polymerising in situ unsaturated glycidyl monomers of the general formula

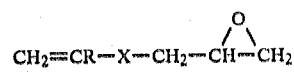

into acrylic polymers, R denoting hydrogen, —CH$_3$ or —C$_2$H$_5$ and X denoting —COO—, —CONH— and/or —CH$_2$—O.

It is particularly preferred in accordance with (1) that the resins containing 1,2-epoxide groups are polyglycidyl ethers of the general formula

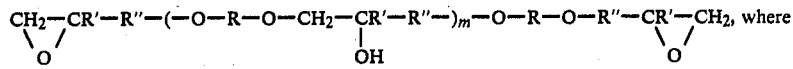

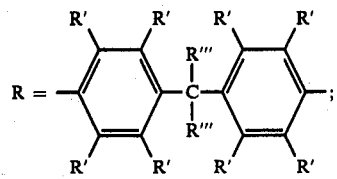

R' = C$_n$H$_{2n+1}$, hydrogen or halogen
R" = (CR'$_2$)$_n$—;
R"' = hydrogen, —C$_n$H$_{2n+1}$ and/or —C(halogen)$_3$;
m = 0 to 8; and
n = 1 to 3.

Preferably R' denotes hydrogen, R" denotes —CH$_2$— and R"' denotes —CH$_3$.

They have an epoxy-equivalent weight of more than 170, preferably more than 400 and, appropriately, below 3000, preferably below 200 and can also be employed in the hydrogenated form. These resins are reaction products of epichlorhydrin with dioxy-diphenylmethane (Bisphenol F) or dioxy-diphenylpropane (Bisphenol A). Epoxidised polyglycidyl ethers may also contain base components, such as triglycidyl isocyanurate, heterocyclic diglycidyl compounds (West German Patent Application No. A 18 16 095), substituted hydantoins, such as N,N-diglycidyl-5,5'-dimethylhydantoin (U.S. Pat. No. 3,391,097), dicyclopentadiene diepoxide or 1-epoxyethyl-3,4-epoxy-cyclohexane.

In order to reduce the functional activity of the polyglycidyl ethers, a proportion of the epoxide groups can be reacted with monocarboxlyic acids, which form ester groups that are as stable to saponification as possible, such as benzoic acid, dimethylolpropionic acid, iso-palmitic acid or versatic acid and/or linear, branched or cyclic saturated or unsaturated monohydric alcohols or varying chain lengths. Preferred chain extension agents are organic polyhydric alcohols, such as hexan-1,6-diol or dioxydiphenyl propane, particularly polymeric polyols, such as polyoxyalkylene glycols or polyether polyols and/or aromatic or cycloaliphatic polycarboxylic acids that do not permit intramolecular anhydride formation, such as isophthalic acid, cyclohexane-1,4-dicarboxylic acid or dimer fatty acids. When polyhydric alcohols or polycarboxylic acids, having more than two functional groups, such as trishydroxyethyl isocyanurate or trimethylolpropane, are incorporated, the functional activity is increased.

Glycidyl group-containing polymers under (2) are preferably taken to mean epoxy/acrylic polymers containing in polymerised state 2 to 20% by weight of glycidyl (meth)acrylate, N-glycidyl (meth)acrylamide or allylglydicyl ether, in addition to other monomers, which, preferably, do not contain any further reactive groups. These include (meth)acrylic esters with saturated linear, branched or cycloaliphatic C$_1$ to C$_{18}$ monohydric alcohols or unsubstituted or substituted styrenes. The selection of the proportion of soft and hard monomers takes place in connection with the desired hardness for the stoved film. The "soft" monomers employed are C$_2$ to C$_{18}$ acrylic esters, such as ethyl acrylate, n-butyl acrylate or ethylhexyl acrylate, or C$_5$ to C$_{18}$ methacrylic esters, such as lauryl methacrylate or ethylhexyl methacrylate and n-butyl methacrylate.

The hard monomers used are C$_1$ to C$_4$ methacrylic esters, such as methyl methacrylate or tert. butyl methacrylate, and methyl acrylate, styrene or vinyl toluene. Suitable maleic or fumaric esters with C$_1$ to C$_{18}$ monohydric alcohols, such as dibutyl fumarate or dibutyl maleate, can also be incorporated by polymerisation. Monomers containing hydroxyl groups, particularly those containing secondary hydroxyl groups, such as hydroxyalkyl(meth)acrylic esters or (meth)acrylic or maleic semi-esters, can also be incorporated, to a slight extent, for obtaining certain effects. Preference is given to epoxy/acrylic copolymers with at least 5 or at most 15% by weight of glycidyl (meth)acrylate and it is particularly preferred to copolymerise them with predominantly soft monomers. The epoxy-equivalent weight is at least 200, particularly at least 400 and at most about 5000, particularly at most 2000. The average molecular weight largely depends on the polymerisation process and may lie between 500 and 100,000. The mean number average is at least 1000, particularly at leat 2000 and at most 60,000, particularly at most 10,000. Low molecular weights are obtained by solution polymerisation in organic solvents, such as alcohols and glycol ethers, at about 60° to 145° C., with addition of radical initiators, such as peroxides, hydrogen peroxides, peresters or thermally dissociable azo-compounds. After complete polymerisation of the mixture, the solvent can be distilled off to a large extent, at temperatures of 60° to 120° C., by applying a vacuum, if necessary, and the product, after partial neutralisation of the carboxyl groups present, can be diluted with water to a solids content of about 75 to 50% by weight.

For attaining higher molecular weights, polymerisation is effected by slow addition of the monomer mixture to a vigorously stirred aqueous phase at temperatures of 20° to 100° C., preferably 60° to 95° C., with addition, if appropriate, of up to 3% by weight of polymerisation regulators, such as lauryl mercaptan, tertiary butyl o-thiocresol, thiosalicyclic acid, dimeric α-methylstyrene or buten-1-ol. The ratio of water to monomer mixture is chosen such that the fully polymerised product has a solids content of about 20 to 50% by weight. Generally, water-soluble radical-forming substances, such as hydrogen peroxide or ammonium peroxobisulphate, are used as initiators.

In order to improve the rheological properties on stoving and the flexibility and impact strength of the hardened coatings, up to 20% by weight, preferably 5 to 15% by weight, of Component D, being a hydroxyl group-containing, long chain modifying agent, based on esterified polyglycidyl ethers and/or unsaturated or saturated polyesters and/or (meth)acrylic copolymers, having an OH-number of 50 to 650, preferably 100 to 500, and an average molecular weight ($\overline{M}n$) of 300 to 7000, preferably 1000 to 5000, are added. The resins must be in a molecular weight range such that they are not volatile on stoving any longer, but reach improved flowability under the influence of heat.

The preparation of suitable resins is known and is effected in the customary manner by azeotropic or melt condensation of the starting products, possibly in the presence of suitable catalysts. Esters of polyglycidyl ethers, such as, for example, liquid epoxy resins, are obtained by reaction with such a quantity of synthetic saturated or drying monobasic fatty acid, such as iso-nonanoic acid, coconut first runnings fatty acid, soya bean oil fatty acid, tall oil fatty acid, linseed oil fatty acid, isomerised linseed oil fatty acid or synourin fatty acid, that all epoxy groups are reacted, but the OH-groups remain unesterified. According to a particular embodiment, for example, solid epoxy resins are reacted with hydroxy-carboxylic acids, such as dimethylol-propionic acid, lactic acid or hydroxy-stearic acid, in the presence of triphenyl phosphine. According to another embodiment, polyglycidyl ethers of Bis-phenol A are reacted with amino-alcohols having a secondary NH-group, for example diethanolamine, di-n-butanolamine, methyl ethanolamine, di-isopropanolamine or N-cyclohexyl ethanolamine. Complete esterification of the starting components ensures that the acid number of the resins lies below 5, preferably below 2, mg KOH/g of solid.

Suitable polyesters containing OH-groups are also prepared by esterification of polyhydric alcohols, monohydric alcohols and dicarboxylic and tricarboxylic acids or their anhydrides, a Patton alkyd constant of 1.00 to 1.20, preferably 1.03 to 1.10, being adjusted by choosing the quantitative ratios. The same raw materials are preferred as in the case of the carboxyl group-containing polyester, with the difference that, in order to obtain a higher elasticity, the dicarboxylic acid is not taken from among cyclic dicarboxylic acids and only long chain, aliphatic dicarboxylic acids, such as azelaic acid, sebacic acid or dimer fatty acids are used. The acid number of these polyesters lies below 25, appropriately below 15, mg KOH/g.

Addition of suitable OH-group-containing copolymers under D enables the properties with respect to throwing paper, hardness and elasticity or anti-corrosive protection to be varied, depending on the selection of the suitable monomers.

Examples of vinyl monomers containing aliphatic alcoholic groups are hydroxyalkyl (meth)acrylic esters, such as hydroxypropyl acrylate, butanediol monomethacrylate, 2,2-dihydroxypropyl methacrylate, diethyleneglycol monomethacrylate, N-hydroxylalkyl (meth)acrylamides, e.g. N-(2-hydroxyethyl) methacrylamide, N,N-bis-(hydroxyethyl)acrylamide, N-2-hydroxyl-1,1-bis(hydroxymethyl)-ethyl methacrylamide, allyl alcohol or polyhydric alcohol monoallyl ethers, e.g. trimethylolpropane monoallyl ether or pentaerythritol monoallyl ether. Apart from the OH-group-containing monomers, (meth)acrylic esters, styrene, vinyltoluene, dialkyl maleinates or dialkyl fumarates, acrylonitrile etc. are employed. The OH-groups can also be incorporated by reacting copolymers containing carboxyl groups with alkylene oxides, e.g. ethylene oxide or propylene oxide. Copolymers containing primary OH-groups are preferred. The copolymerisation is carried out in the customary manner, by heating in organic solvents, such as secondary butanol, Cellosolve or butyl Cellosolve (2-ethoxyethanol or 2-butoxyethanol), with addition of radical initiators, soluble in monomers, such as tert.-butyl peroctoate, tert.-butyl hydroxyperoxide, cumene hydrogen peroxide, di-tert.-butyl peroxide or azo-bis-isobutyronitrile.

For optimum regulation of the mechanical and chemical properties of the paints or coatings, it is also possible, where appropriate, to add small quantities of polyhydrocarbons, such as polyleutadiene oils, coumarone-/indene resins or formaldehyde condensation resins, such as phenolic resins, melamine resins, benzoguanamine resins or etherified methylolated (meth)acrylamide copolymers, their quantity being appropriately below 10% by weight, related to the total weight of the coating medium.

For the preparation of a suitable coating composition at least 40 parts by weight, particularly more than 50 parts by weight or at most 90 parts by weight, particularly less than 80 parts by weight of carboxyl group-containing polyesters are mixed with at least 5 parts by weight, particularly more than 10 parts by weight and at most 40 parts by weight, particularly less than 30 parts by weight of epoxy resin and at least 5 parts by weight and at most 30 parts by weight of a blocked isocyanate, optionally with addition of 0 to 15 parts by weight, particularly 5 to 12 parts by weight of a hydroxyl group-containing polyester and/or acrylic resin.

If the content of carboxyl group-containing polyester is too low, the stability of the dispersion may be put at risk; if the content is too high, the crosslinking of the film is inadequate. The loading capacity of the carboxyl group-containing polyester with neutral resin combination substances generally increases with rising acid number. As a result of the higher content of carboxyl groups per molecule, the risk of gelling, as a result of premature reaction with the epoxide groups, rises simultaneously. Optimum properties are achieved when the reaction of the functional groups within the resin combination during the thermal film formation is as complete as possible.

The incorporation of the epoxy resin and of the blocked isocyanate can be effected in various ways:

1. Dispersing the pulverulent, ideally micronised epoxy resin and blocked isocyanate into the partly thinned, partly neutralised, water-soluble carboxyl group-containing polyester by means of the auxiliary materials that are customary in paint manufacture. Production of the powder may be effected by suitable milling or precipitating the resin from organic solutions with water, in which case the particle size shall be below 20 $\mu$m, particularly below 10 $\mu$m and very particularly below 5 $\mu$m.

2. Melting or dissolving the water-insoluble epoxy resin and blocked isocyanate in the carboxyl group-containing polyester at temperatures of below 120° C., preferably below 100° C., possibly with addition of organic solvents; subsequent neutralisation with amines and gradual dilution with water, the water-insoluble resin being precipitated in finely divided form. Care has to be taken that no precipitation shock is caused by excessive portions of water. It has proved useful to stir in first the amine, possibly with addition of an equal quantity of water, and then to add the remaining water in increasing quantities, approximately corresponding to a geometric series. The stability is influenced, moreover, by the solvent employed and should be separately tested for the particular combination. Those solvents are preferred particularly that do not begin to dissolve the powder.

3. Mixing a carbonyl group-containing polyester solution with an aqueous dispersion of the epoxy resin and/or of the blocked isocyanate, which are prepared separately.

4. Making as concentrated a solution as possible of the epoxy resin and of the blocked isocyanate in organic, water-thinnable solvents, such as alcohols, particularly secondary butanol or isopropanol, ethylene glycol monoalkyl ethers and propylene glycol monoalkyl ethers having a low-molecular alkyl radical ($C_1$ to $C_4$), diethylene glycol dimethyl ether, diacetone alcohol or tetrahydrofuran. These organic solutions are stirred into the solution of the carboxyl group-containing polyester preferably at room temperature, if necessary up to about 60° C., neutralised with amines or amino-alcohols, particularly tertiary amines or amino-alcohols, and subsequently diluted carefully with water. This is the preferred method.

Pre-condensation of the individual resin components with the carboxyl group-containing polyester is feasible for increasing compatibility. It is carried out by careful heating to from 60° to 140° C. and must not lead to gelling of the mixture.

Water solubility is achieved by formation of salts from the carboxyl group-containing resins and the basic compounds. Ammonia, primary, secondary and, particularly, tertiary amines, such as diethylamine, triethylamine and morpholine, as well as alkanolamines, such as di-isopropanolamine, di-methylaminoethanol, tri-isopropanolamine, dimethylamino-2-methylpropanol, quaternary ammonium hydroxides or possibly also small quantities of alkylene polyamines, such as ethylene di-amine, are suitable for this purpose. The choice of the amine neutralising agent influences the stability of the aqueous dispersion and has to be tested accordingly. Amino-alcohols are preferred particularly on account of their weak basicity. The upper limit for the quantity of amine added results from the 100% degree of neutralisation of the carboxyl groups present. The lower limit depends on the stability of the dispersion prepared and on the capacity of the replenishing concentrate to be dispersed in the mixture. Preferably, the base is used in stoichiometric deficiency, calculated on the carboxyl function of the reaction product, since the amine only has a solvent action on over-neutralisation and leads to surface troubles during the electrophoretic deposition. According to experience, the degree of neutralisation lies between 40 and 100%. The pH value of the neutralised coating medium shall be about 6.5 to 9.0, preferably 7 to 8.5. If the pH value is too low, dispersion difficulties arise and the resin is precipitated; if it is too high, increased electrolysis occurs and the surface is impaired.

The coating medium may contain small quantities of organic solvents for lowering the viscosity, for controllig the deposition voltage and for improving adhesion and levelling. As low a content of organic solvents is aimed at as possible.

Alcohols, glycol ethers, keto-alcohols, ketones or aliphatic and aromatic hydrocarbons of varying chain lengths serve as solvents. If the additive resins are incorporated in powder form, care must be taken that the epoxy resins and blocked polyisocyanates in the resulting dispersion are not partially dissolved, because, otherwise, coagulation may occur. On the other hand, proportions of water-insoluble solvents may facilitate and stabilise the dispersion operation. It should be borne in mind, when using epoxy resin and polyisocyanate solutions, that the stability of the end-product depends on the concentration of the individual components. Thus the stability of the varnish is imparied again by an excessive content of epoxy resin.

Appropriately, the solids content of the paint, after dilution with water, is 5 to 30% by weight, preferably 10 to 20% by weight. If the solids content is too low, the low content of polycarboxylic acid resin yields an unevenly deposited rough film; if the solids content is too high, the viscosity of the bath rises as a result of the high resin concentration, leading to excessive discharge and rinsing losses. Appropriately, the electrophoretic deposition takes place, at the earliest, 24 hours after the preparation of the bath. The bath is appropriately stirred continuously during this period, so as to achieve uniform distribution. As is known in the case of electrophoretic deposition, the object, made of conductive metal and to be anodically coated, and the cathode are immersed into an aqueous bath. In principle, all working parts, made of conductive metal, can be coated, such as copper, aluminium, tin, zinc, iron and alloys of these metals; iron is preferred. During deposition, the bath is maintained at temperatures of, appropriately, about 20° to 35° C. At lower temperatures, the tendency to electric breakdown on raising the deposition voltage decreases. Electric deposition starts after less than a second and may be extended up to from 3 to 5 minutes for increasing the layer thickness and the throwing power (coverage).

Solids content, deposition temperature and deposition time as well as voltage are chosen such that the desired layer thickness is obtained after rinsing with water and stoving.

Hardening is effected by short baking at a high temperature or long baking at a low temperature. In that case, the baking time can be varied fom one minute to one hour and the temperature of the object from at least 120° C., particularly above 140° C. to 230° C., maximum, preferably below 200° C. On application of a voltage of 50 to 400 Volt, appropriately, the carboxyl group-containing polyester resin is discharged at the anode and coagulated. In this case, the current transports, at the same time, the water-insoluble resin and the dispersed pigment. At this juncture, the ratio of water-soluble polyester to water-insoluble resins and pigments is altered. At the same time, the bath is enriched in water and the amine used for nuetralisation. More concentrated paint compositions have to be used therefore for replenishing, which compensate for those changes in the quantitative ratios, or they are corrected by suitable apparatus, as used in electrodialysis processes. Coagulated particles or particles having an unduly large diameter are filtered off at this stage.

Pigmentation is carried out in a customary manner, for example in a ball-mill, triple roller mill, pearl-mill or sand-mill. In that case, the pigment can either be melted into the water-insoluble solid resin and then jointly milled or it is incorporated into the carboxyl group-containing polyester before or after nuetralisation.

Customary pigments, fillers, corrosion inhibitors, such as strontium chromate or zinc phosphate, and paint additives, such as antifoams, can be used in pigmentation, provided that they do not enter into interfering reactions with water of weakly basic to neutral pH value, do not entrain any water-soluble interfering foreign ions and are not precipitated, on aging, so as not to be re-dispersible. Examples of inorganic pigments are titanium dioxide, iron oxides, chromium oxides, carbon black and also metallic powders, such as zinc or aluminium; organic pigment that can be used are azo pigments, phthalocyanines or polycyclic pigments, such as perylene derivatives. The mean particle size should not exceed 30 μm and be particularly below 10 μm, very particularly below 5 μm, because larger pigment parts generate an undesirable film roughness, especially on horizontal surfaces. The bath is stirred continuously, so as to maintain a uniform temperature at the anode surface and to prevent sedimentation of the insoluble constituents of the dispersion. The pigment/binder ratio depends on the viscosity of the binder and generally lies between 0.1:1 and 1.5:1.

The pigments employed can also be the so-called interference pigments, for example, mica flakes coated with rutile.

Through the coating compositions being adjusted to a solids content of 25 to 50% by weight, preferably 30 to 45% by weight, water-thinnable stoving paints are obtained, which can be applied by dipping, spraying, roller-coating etc. To the object to be coated.

The paints are particularly suitable for the electrophoretic coating of metals and, after stoving for 30 minutes at 180° C., yield smooth, glossy, hard films having good adhesion and elasticity.

The aim is to obtain the highest possible layer thicknesses. According to the invention, it is possible to obtain layer thicknesses of more than 25 μm and up to about 70 μm on deposition. With a view to optimum properties, the upper limit for layer thickness is appropriately about 50 μm, with special preference for about 45 μm. The lower limit for layer thickness is preferably about 35 μm.

EXEMPLARY PREPARATIONS

(A) Polyester containing carboxyl groups (A1) 1047 g of neopentyl glycol and 217 g of trimethylolpropane were filled under inert gas into a reaction flask, equipped with a heated column, and carefully melted down. After starting the stirrer, 433 g of isophthalic acid and 200 g of trimellitic anhydride were added. The mixture was slowly heated to 200° C., while the column transition temperature was not to exceed 103° C. 858 g of isodecanol and 1245 g of trimellitic anhydride were added in succession to the clear mixture at an intermediate acid number of 13, the temperature falling to from 150° to 160° C. The further esterification was carried out first at a lower temperature (150° C.) and then at a higher temperature (170° to 180° C.), so as to avoid foam, while, in addition, the column was being removed. After an
acid number: 49 mg KOH/g of solid resin and a
viscosity: 655 mPas (after dilution to 50% by weight with ethylene glycol monobutyl ether at 25°)
had been reached, the mixture was cooled to 120° C. and subsequently diluted with ethylene glycol monobutyl ether and secondary butanol in the ratio of 1:4 to a theoretical solids content of 75% by weight.

(A2) Reaction as in (A1), the following quantities being employed:
229 g trimethylolpropane
1326 g neopentyl glycol hydroxypivalate
865 g isophthalic acid
806 g isotridecanol—heat until an intermediate acid number of 20 has been reached
774 g trimellitic anhydride
acid number: 49.7
viscosity: 223 mPas

(B) Masked polyisocyanate (B1) 2778 g of biuret-containing trihexamethyl isocyanate were heated to about 80° C. and 2070 g of ε-caprolactam were added sufficiently slowly for the reaction temperature not to exceed 100° C. The mixture was then kept at that temperature until the NCO number had fallen below 0.3%. It was diluted with ethylene glycol monobutyl ether to a solids content of 90% by weight.

(B2) 429 g of isophorone diisocyanate were heated to 80° C. 378 g of ε-caprolactam were then added sufficiently slowly for the reaction temperature not to exceed 100° C. The mixture was then kept at that temperature until the NCO number had fallen below 0.1%. It is diluted with ethylene glycol monobutyl ether to 80% by weight.

(C) Solution containing glycidyl group-containing polymers (C1) 350 g of ethylene glycol monobutyl ether were heated to about 120° C. and 1300 g of an epoxy resin, based on bis-phenol A, having an epoxy-equivalent weight of about 900 were slowly added. After dissolution of the solid resin, the solution was adjusted with sec.-butanol to a solids content of 65% by weight.

(C2) A mixture of 343 g of hydroxyethyl acrylate, 391 g of glycidyl methacrylate, 1217 g of butyl acrylate, 437 g of butyl methacrylate and 29 g of tertiary-butyl perbenzoate was added dropwise to 1200 g of ethylene glycol at about 115° C. within three hours and subsequently polymerised completely within 5 hours, with further additions of 8.4 and, later, 5.6 g of tertiary-butyl perbenzoate. Solvent was distilled off at 65° to 80° C. under reduced pressure to a solids content of 70% by weight.
viscosity = 780 mPas (after dilution to 60% by weight with ethylene glycol monoethyl ether at 25% C.)
epoxy-equivalent = 866

(D1) Polyester containing hydroxyl groups 1129 g of trimethylolpropane were carefully melted and then heated to 120° C. with slow stirring. After addition of 470 g of sebacic acid, the product was esterified at 200° to 240° C. to an acid number of 8.

(D2) Acrylic resin containing hydroxyl groups

A mixture of 636 g of n-butyl acrylate, 344 g of hydroxyethyl acrylate and 10 g of bis-(isobutyro-nitrile) was added dropwise to 667 g of secondary butanol at about 100° C. within three hours and subsequently polymerised completely within 4 hours, with addition of two portions of 3 ml each of tertiary-butyl peroctoate.

Solids content = 59.2% by weight (measured by heating to 180° C. for 40 minutes in a circulating air drying oven)

EXAMPLE 1

146.4 g of the carboxyl group-containing polyester, described in Exemplary Preparation A1, were mixed with 13.5 g of ethylene glycol monobutyl ether and 33.9 g of a commercial levelling agent (for example, phthalate plasticiser). 100.2 g of titanium dioxide were added with stirring and dispersed in a pearl-mill at 60° C. (maximum). After cooling, 46.2 g of epoxy resin solution described in Exemplary Preparation C1, 18.6 g of masked polyisocyanate solution described in Exemplary Preparation B1 and 43.2 g of hydroxyl group-containing polyester described in Exemplary Preparation D1 were added separately in succession, with stirring. After addition of 36 g of diisopropanolamine (50%), the product was diluted with water to give a 15% aqueous solution.

For deposition results, see Table 1.

EXAMPLE 2

199.5 g of the carboxyl group-containing polyester, described in Exemplary Preparation A1, were mixed with 6 g of ethylene glycol monobutyl ether and 15.75 g of levelling agent. 100 g of titanium dioxide were added with stirring and dispersed in a pearl-mill at 60° C. (maximum). After cooling, 45.8 g of epoxy resin solution described in Exemplary Preparation C1, 11.25 g of polyisocyanate solution described in Exemplary Preparation B1 and 10.13 g of hydroxyl group-containing polyester described in Exemplary Preparation D1 were added separately in succession, with stirring. After addition of 40 g of diisopropanolamine (50%), the product was diluted with water to give a 15% aqueous solution.

For deposition results, see Table 1.

EXAMPLE 3

173.4 g of the carboxyl group-containing polyester, described in Exemplary Preparation A1, were mixed with 6 g of secondary butanol and 21.9 g of levelling agent. 100.2 g of titanium dioxide were added with stirring and dispersed in a pearl-mill at 60° C. (maximum). After cooling, 57.2 of epoxy resin solution described in Exemplary Preparation C2, and 37.5 g of masked polyisocyanate solution described in Exemplary Preparation B2 were added separately in succession, with stirring. After addition of 36 g of di-isopropanolamine (50%), the product was diluted with water to give a 15% aqueous solution.

For deposition results, see Table 1.

EXAMPLE 4

146.4 g of the carboxyl group-containing polyester, described in Exemplary Preparation A1, were mixed with 12 g of ethylene glycol monobutyl ether and 21.9 g of levelling agent. 100.2 g of titanium dioxide were added with stirring and dispersed in a pearl-mill at 60° C. (maximum). After cooling, 46.2 g of epoxy resin solution described in Exemplary Preparation C1, 36.5 g of masked polyisocyanate solution described in Exemplary Preparation B2 and 30 g of hydroxyl group-containing polyester described in Exemplary Preparation D1 were added separately in succession, with stirring. After addition of 36 g of di-isopropanolamine (50%), the product was diluted with water to give a 15% aqueous solution.

For deposition results, see Table 1.

TABLE 1

| | Example 1 | Example 2 | Example 3 | Example 4 |
|---|---|---|---|---|
| pH value | 8.8 | 8.5 | 8.6 | 8.7 |
| conductivity ($uScm^{-1}$) | 610 | 750 | 650 | 600 |
| solids (% by weight) | 15.1 | 15.3 | 14.9 | 14.65 |
| pigment/binder ratio | 0.5:1 | 0.5:1 | 0.5:1 | 0.5:1 |
| MEQ value | 43.1 | 47.3 | 45.5 | 45.3 |
| deposition conditions | 2 min. @ 25° C. | 2 min. @ 25° C. | 2 min. @ 25° C. | 2 min. @ 25° C. |
| bonderizing | zinc phosphatising | iron phosphatising | zinc phosphatising | zinc phosphatising |
| deposition voltage for 35–40 μm | 140 | 250 | 160 | 200 |
| stoving temperature | 20 min. @ 180° C. | 25 min. @ 175° C. | 20 min. @ 180° C. | 20 min. @ 180° C. |
| pendulum beam hardness (DIN 53157) | 62 sec. | 133 sec. | 120 sec. | 122 sec. |
| Erichsen depression (DIN 53156) | >9 mm | 6.1–6.7 mm | 8.4–8.5 mm | 4.5 mm |
| mandrel bending test (DIN ⌀ 8 mm) | B 0 | B 1–2 | B 0 | B 1 |
| condensed moisture box (DIN 50017 SK) | 500 hours sat. | 500 hours sat. | 500 hours sat. | 500 hours sat. |
| maximum bubble-free layer thickness attainable | 60 μm | 40 μm | 50 μm | 45 μm |
| surface rating | sat. | sat. | sat. | sat. |
| detergent resistance | sat. | sat. | sat. | sat. | sat. = satisfactory

What is claimed is:

1. An aqueous anodic electrophoretic coating composition comprising:
   (A) 40 to 90% by weight polyesters containing carboxyl groups, having an acid number of 30 to 150, a hydroxyl number of 20 to 150 and a Patton alkyd constant of 0.9 to 1.2;
(B) 5 to 30% by weight blocked polyisocyanates;
(C) 5 to 40% by weight polymers containing glycidyl groups and free epoxy groups and
(D) 0 to 20% by weight hydroxyl group containing compounds selected from the group consisting of polyesters and acrylic resins.

2. The aqueous coating composition of claim 1, wherein said polyesters are produced from compounds selected from the group consisting of dihydric and polyhydric aliphatic and cycloaliphatic saturated alcohols, aliphatic, cycloaliphatic and monocyclic aromatic dibasic and polybasic polycarboxylic acids, linear and branched, saturated and unsaturated, aliphatic and cycloaliphatic $C_3$ to $C_{20}$ monohydric alcohols and monobasic carboxylic acids and mixtures thereof.

3. The aqueous coating composition of claim 1, wherein the polymers containing glycidyl groups are polyglycidyl ethers containing 1,2-epoxide groups and, on average, more than oen epoxide group per molecule and have a molecular weight of more than 350.

4. The aqueous coating composition of claim 3, wherein said polyglycidyl ethers contain at least two epoxide groups.

5. The aqueous coating composition of claim 3, wherein said polyglycidyl ethers have a molecular weight of more than 850.

6. The aqueous coating composition of claim 3, wherein the polyglycidyl ethers comprise ethers of the general formula

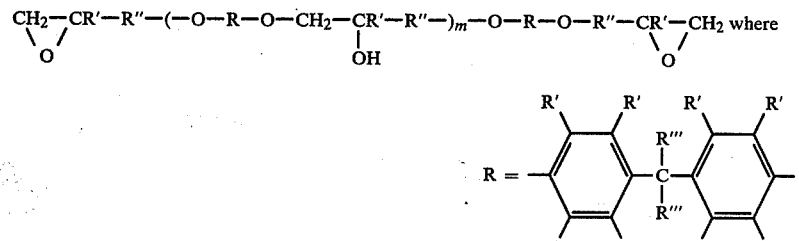

$R' = -C_nH_{2n+1}$, hydrogen or halogen;
$R'' = -(CR'_2)_n-$;
$R''' =$ hydrogen, $-C_nH_{2n+1}$ and/or $-C(halogen)_3$;
$m = 0$ to 8 and
$n = 1$ to 3.

7. An aqueous coating composition of claim 6, wherein
$R'$ is hydrogen
$R''$ is $-CH_2-$ and
$R'''$ is $-CH_3$.

8. An aqueous coating composition of claim 1, wherein said polymers containing glycidyl groups are polyglycidyl esters as polymerization products of 2 to 20% by weight of glycidyl (meth)acrylate and unsaturated monomers having a double bond as the only reactive group.

9. An aqueous coating composition of claim 8, wherein said polyglycidyl esters contain, on average, more than one epoxide group per molecule and have an average molecular with $\overline{M}_n$ of at least 500.

10. An aqueous coating composition of claim 9, wherein said polyglycidyl esters contain at least two epoxide groups.

11. An aqueous coating composition of claim 10, wherein said average molecular weight is at least 1000.

12. A process for the preparation of an aqueous coating composition comprising mixing:
(A) carboxy group—containing polyesters, having an acid number of 30 to 150, a hydroxyl number 20 to 150 and a Patton alkyd constant of 0.9 to 1.2;
(B) 5 to 30% by weight blocked polyisocyanates;
(C) 5 to 40% by weight polymers containing glycidyl groups and free epoxy groups and
(D) 0 to 20% by weight hydroxyl group-containing compounds selected from the group consisting of polyesters and acrylic resins.

13. The process of claim 12, wherein said carboxyl group-containing polyesters are produced by reacting compounds from the group consisting of dihydric and polyhydric aliphatic and cycloaliphatic saturated alcohols, aliphatic, cycloaliphatic and monocyclic aromatic dibasic and polybasic polycarboxylic acids, linear and branched, saturated and unsaturated, aliphatic and cycloaliphatic $C_2$ to $C_{20}$ monohydric alcohols and monobasic carboxylic acids and mixtures thereof.

14. The process of claim 12, wherein said mixing of A, B, C and D is in solution.

15. The process of claim 12, wherein said mixing comprises mixing said C as a powder into said A.

16. The process of claim 12, wherein said mixing comprises dissolving said B and said C into said A.

17. The process of claim 16 further comprising dispersing the mixture of A, B and C in water.

18. The process of claim 12, wherein said mixing comprises forming aqueous dispersions of said B and said C and mixing said dispersions in a solution of said A.

19. The process of claim 12, wherein said mixing comprises forming concentrated solutions of said B and said C in organic, water-miscible solvents and mixing said concentrated solutions with an aqueous solution of said A.

20. A process of coating a substrate comprising the electrophoretic disposition of the aqueous coating composition of claim 1.